(12) United States Patent
Lee et al.

(10) Patent No.: US 10,044,703 B2
(45) Date of Patent: Aug. 7, 2018

(54) USER DEVICE PERFORMING PASSWORD BASED AUTHENTICATION AND PASSWORD REGISTRATION AND AUTHENTICATION METHODS THEREOF

(71) Applicants: Jesang Lee, Seoul (KR); Sunghyun Kim, Anyang-si (KR); Minja Han, Seoul (KR)

(72) Inventors: Jesang Lee, Seoul (KR); Sunghyun Kim, Anyang-si (KR); Minja Han, Seoul (KR)

(73) Assignee: Samsung Electronics Co., Ltd. (KR)

(*) Notice: Subject to any disclaimer, the term of this patent is extended or adjusted under 35 U.S.C. 154(b) by 424 days.

(21) Appl. No.: 14/602,825

(22) Filed: Jan. 22, 2015

(65) Prior Publication Data

US 2015/0249658 A1 Sep. 3, 2015

(30) Foreign Application Priority Data

Feb. 28, 2014 (KR) .................. 10-2014-0024427

(51) Int. Cl.

| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/46* | (2013.01) | |
| *H04L 9/32* | (2006.01) | |
| *G06F 21/31* | (2013.01) | |
| *H04L 9/08* | (2006.01) | |

(52) U.S. Cl.
CPC ............ *H04L 63/083* (2013.01); *G06F 21/31* (2013.01); *G06F 21/46* (2013.01); *H04L 9/0863* (2013.01); *H04L 9/3226* (2013.01)

(58) Field of Classification Search
CPC ....... H04L 9/06; H04L 9/0618; H04L 9/0625; H04L 9/08; H04L 9/0861; H04L 9/0863; H04L 9/0869; H04L 9/3226; H04L 63/083; H04W 12/06; G06F 21/30; G06F 21/31

See application file for complete search history.

(56) References Cited

U.S. PATENT DOCUMENTS

| | | | |
|---|---|---|---|
| 5,787,169 A * | 7/1998 | Eldridge ................ | G06F 21/40 380/286 |
| 8,180,054 B2 | 5/2012 | Sakamoto | |
| 8,422,670 B2 | 4/2013 | Shin et al. | |
| 2003/0101345 A1* | 5/2003 | Nyberg ................ | H04W 12/06 713/170 |

(Continued)

FOREIGN PATENT DOCUMENTS

| | | |
|---|---|---|
| JP | 09-330298 | 12/1997 |
| JP | 2001-344211 | 12/2001 |

(Continued)

*Primary Examiner* — Daniel B Potratz
(74) *Attorney, Agent, or Firm* — Myers Bigel, P.A.

(57) ABSTRACT

A password registration method of a user device which uses a password-based authentication manner is provided. The password registration method includes combining a salt to an input password to generate a combination password; expanding the combination password to generate an expanded password of which a data length is increased; compressing the expanded password to output authentication data; and storing the authentication data in an authentication database.

19 Claims, 12 Drawing Sheets

(56) References Cited

U.S. PATENT DOCUMENTS

| | | | | |
|---|---|---|---|---|
| 2008/0092216 A1* | 4/2008 | Kawano | ............... | G06F 21/46 |
| | | | | 726/5 |
| 2008/0140577 A1* | 6/2008 | Rahman | ............ | G06Q 20/3829 |
| | | | | 705/71 |
| 2008/0235772 A1* | 9/2008 | Janzen | ................ | G06F 21/31 |
| | | | | 726/5 |
| 2010/0239087 A1* | 9/2010 | Chaisson | ............. | G06F 21/46 |
| | | | | 380/44 |
| 2011/0091038 A1 | 4/2011 | Thueringer | | |
| 2014/0032922 A1* | 1/2014 | Spilman | ............. | G06F 21/602 |
| | | | | 713/184 |

FOREIGN PATENT DOCUMENTS

| | | |
|---|---|---|
| JP | 2008-243045 | 10/2008 |
| JP | 2009-205500 | 9/2009 |
| JP | 4641121 B2 | 12/2010 |
| JP | 5315564 B2 | 7/2013 |
| KR | 10-0860573 B1 | 9/2008 |
| KR | 10-0954841 B1 | 4/2010 |

* cited by examiner

USER DEVICE PERFORMING PASSWORD BASED AUTHENTICATION AND PASSWORD REGISTRATION AND AUTHENTICATION METHODS THEREOF

CROSS-REFERENCE TO RELATED APPLICATIONS

A claim for priority under 35 U.S.C. § 119 is made to Korean Patent Application No. 10-2014-0024427 filed Feb. 28, 2014, in the Korean Intellectual Property Office, the entire contents of which are hereby incorporated by reference.

BACKGROUND

The inventive concepts described herein relate to an electronic device, and more particularly, relate to a user device to perform password-based user authentication and password registration and authentication methods thereof.

As the internet, communication lines, computers, and mobile devices are rapidly developed, there are provided wire and wireless internet-based services such as shopping, games, chatting, and electronic payment. Also, games, payments, and internet connections using a mobile device may increase due to a rapid supply of a handheld personal terminal and a growth of a wireless environment. In addition, there may be an increase in the demand for electronic devices that may use a security function.

The user authentication may be a procedure where a user utilizes a service based on a wire or wireless network or terminal. That is, the use of devices or networks and allowance on entrance are determined via user authentication, and a service is provided according to the determination result. A typical user authentication system is a password-based authentication system that uses a user's ID or password.

The password-based user authentication typically consists of user registration and user authentication. The user registration may be made for a user to register ID and password in a system. Upon the user registration, authentication data is generated by processing an input password according to a cryptography algorithm. The authentication data and ID may be stored in an authentication database of a system. Afterwards, the user authentication may be executed if a user inputs the ID and password while using a service of a system. If the user inputs the ID and password in the system for user authentication, the password is processed according to a cryptography algorithm that is equal to a cryptography algorithm used at the user registration. And then, whether the user is authenticated is determined based on comparison with the password and authentication data of an ID stored in database.

In the user authentication in which a password is used, however, a cryptography algorithm for processing the password or authentication data generated by the cryptography algorithm may be exposed to an aggressor. The exposed cryptography algorithm or authentication data may be a target of an Exhaustive Search Attack that is used to restore a user's password. In particular, as parallel computing environments, such as GPU (Graphics Processing Unit) or FPGA (Field Programmable Gate Array) techniques are developed, a time taken to perform the Exhaustive Search Attack is shortened. The reason is that the number of password restoration processes capable of being performed in parallel increases. Thus, techniques for overcoming the drawback that the password-based user authentication system is vulnerable to the Exhaustive Search Attack may be desirable.

SUMMARY

One aspect of embodiments of the inventive concept is directed to provide a password registration method of a user device which uses a password-based authentication manner. The password registration method includes combining a salt to an input password to generate a combination password; expanding the combination password to generate an expanded password of which a data length is increased; compressing the expanded password to output authentication data; and storing the authentication data in an authentication database.

Another aspect of embodiments of the inventive concept is directed to provide a password authentication method of a user device which uses a password-based authentication manner. The password authentication method comprises reading first authentication data and a salt corresponding to an ID of a user from an authentication database; combining the salt to an input password to generate a combination password; expanding the combination password to generate an expanded password of which a data length is increased; compressing the expanded password to output second authentication data; and comparing the first authentication data and the second authentication data to authenticate the password of the user.

Still another aspect of embodiments of the inventive concept is directed to provide a user device which performs password-based user authentication. The user device comprises an input/output interface configured to receive an ID and a password of a user; and an expanded cryptography unit configured to expand the password to output an expanded password and compress the expanded password to output authentication data.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
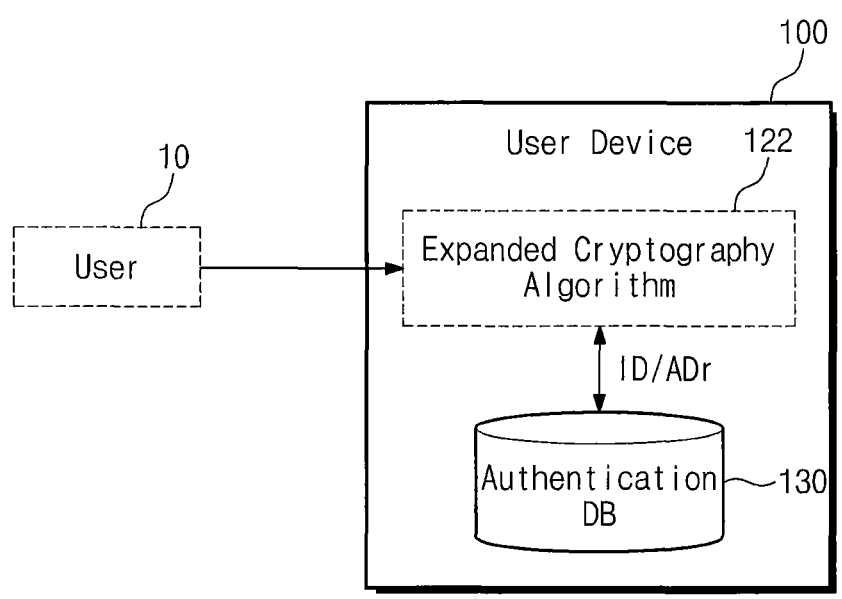
FIG. 1 is a block diagram schematically illustrating schematically illustrating a user device according to an embodiment of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Below, a user device or a device will be used as an example of a unit for describing features and functions of the inventive concept. However, other features and performance of the inventive concept may easily be comprehended according to contents disclosed herein. The inventive concept may be implemented by different embodiments or applied thereto. Further, the detailed description may be modified or changed according to viewpoints and applications without escaping from the scope, spirit, and other objects of the inventive concept. Below, the inventive concept will be described with reference to accompanying drawings.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram schematically illustrating schematically illustrating a user device 100 according to an embodiment of the inventive concept. Referring to FIG. 1, a user device 100 may perform user registration and user authentication for processing ID and password, which a user provides, according to an expanded cryptography algorithm 122, which will be more fully described below.

When registered, a user 10 inputs ID and password PW in a user device 10. The user device 100 processes the input password PW of the user 10 according to an expanded cryptography algorithm 122 and generates authentication data ADr as the processing result. The user device 100 stores the user's ID and the authentication data ADr in an authentication database 130 and then completes user registration. The authentication database 130 may be implemented with a nonvolatile storage device that includes a security area.

The expanded cryptography algorithm 122 may be a cryptography algorithm that increases operation complexity at an encryption operation on a password PW or the amount of memory resources consumed at operations. The expanded cryptography algorithm 122 may be an algorithm that can expand a length of a bit stream of a password PW that the user 10 inputs. Herein, the expanded length of the bit stream may be several times, several hundred times, or several thousand times longer than a length of a bit stream before expansion. In an Exhaustive Search Attack for restoring a password PW, there may be an increase in memory resources that are consumed for the Exhaustive Search Attack using the expanded cryptography algorithm 122. Each parallel process for restoring a password using the expanded cryptography algorithm 122 causes an increase in the memory resources (e.g., several times or several thousand times), as compared with the event when the expanded cryptography algorithm 122 is not used. This may mean a sharp decrease in the number of parallel processes that can be performed in a system that performs the Exhaustive Search Attack using the expanded cryptography algorithm 122.

The expanded cryptography algorithm 122 includes not only a cryptography algorithm for increasing the length of the password PW but also a mixing operation for reconfiguring arrangement of the password with the increased length. It is comprehended that the expanded cryptography algorithm 122 further includes a variety of algorithms capable of increasing the use of the memory resource in addition to expansion of the length of the password PW or reconfiguration of the arrangement of the expanded password. Herein, it is comprehended that a salt is added to increase the length of the password PW and complexity. The salt may be formed of a random number stream that is generated such that its value is varied according to a user.

The expanded cryptography algorithm 122 may perform a compressing operation for generating data, which is a result of processing a password, as a code with a fixed length. Data that is finally produced at an expanded cryptography operation on a password PW may be output as authentication data ADr that has a relatively short length via a compressing operation. As the user device 100 stores the authentication data ADr in the authentication database 130 together with user's ID, there is completed user registration for registering the password PW of the user 10.

Likewise, the expanded cryptography operation on the password PW performed during the user registration may be carried out during the user authentication. A value ADi that is obtained by applying the expanded cryptography algorithm 122 to a password input by a user may be compared with authentication data ADr registered in the authentication database 130 for correspondence.

To use the user device 100, the user 10 inputs ID and password PW in the user device 100. The user device 100 processes the input password PW of the user 10 according to the expanded cryptography algorithm 122 and then generates authentication data ADr. That is, the user device 100 compares the ID, which the user 10 inputs, with authentication data ADr of a corresponding user registered in the authentication database 130. If the authentication data ADr generated for user authentication is the same as the registered authentication data ADr, then the user device 100 allows the connection or employment of the user 10.

There have been described an expanded cryptography algorithm 122 on a password PW executed in a user device 100 and user authentication using the same. With the expanded cryptography algorithm 122, the number of updating operations on the length or arrangement of the password PW may markedly increase during an operation of encrypting the password PW. Although the expanded cryptography algorithm 122 is exposed, the amount of memory resources, which are consumed during a unit process for restoring a password through the Exhaustive Search Attack may increase; therefore, there is restricted the number of parallel processes capable of being driven at the same time as there are restrictions on the memory resources consumed during a parallel process for restoring a password PW through the Exhaustive Search Attack. As understood from the above description, a time taken to perform the Exhaustive Search Attack sharply increases according to application of the expanded cryptography algorithm 122. This may mean that an operation of restoring a password is incapacitated.

Figure 2:
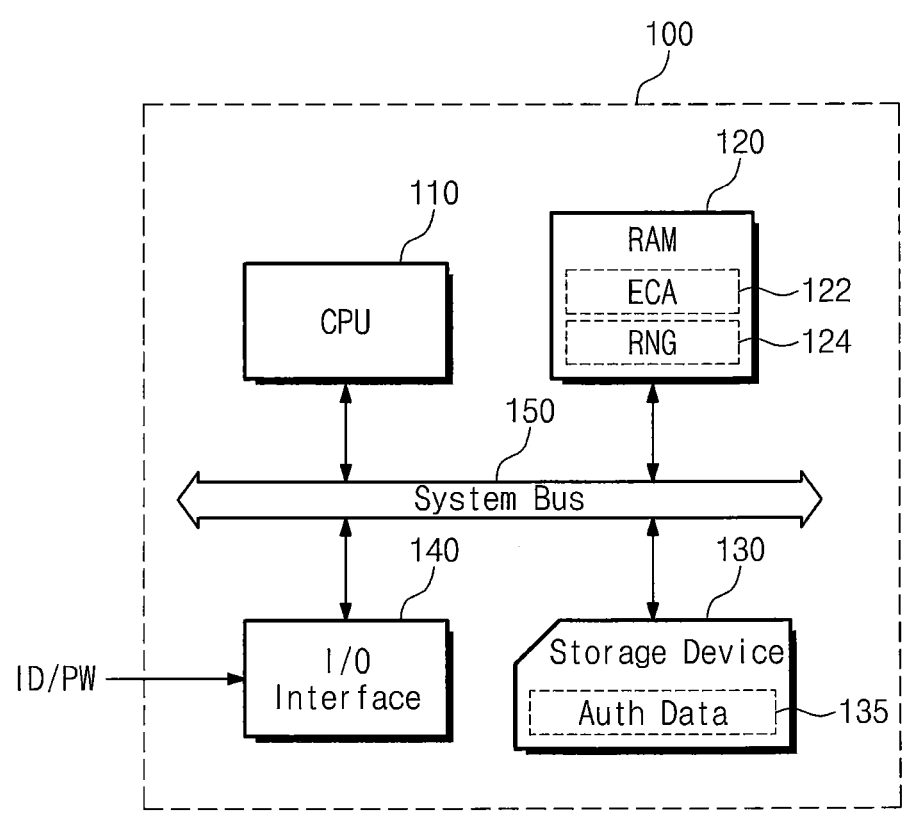
FIG. 2 is a block diagram schematically illustrating a user device according to an embodiment of the inventive concept.

FIG. 2 is a block diagram schematically illustrating a user device 100 according to an embodiment of the inventive concept. Referring to FIG. 2, a user device 100 incorporates a Central Processing Unit (CPU) 110, a RAM 120, a storage device 130, and an input/output interface 140, which are connected electrically to a system bus 150.

The CPU 110 executes software (e.g., application programs, operating systems, device drivers, and so on) that are run on the user device 100. The CPU 110 executes an operating system loaded on the RAM 120. The CPU 110 executes a variety of application programs that run based on the operating system. The CPU 110 performs user registration or user authentication according to an expanded cryptography algorithm (ECA) 122 that is loaded on the RAM 120. The CPU 110 generates a salt for the expanded cryptography algorithm 122 using a random number generation (RNG) module 124.

The RAM 120 acts as a working memory of the CPU 110. The RAM 120 is used to load the expanded cryptography algorithm 122 or the random number generation module 124 for generating the salt. Also, the operating system or basic application programs are loaded on the RAM 120 when the user device 100 is booted. For example, when the user device 100 is booted, an OS image stored in the storage device 130 is loaded on the RAM 120 according to a booting sequence. The operating system may support all input/output operations of the user device 100. Likewise, application programs that are selected by a user 10 are used to provide a basic service may be loaded on the RAM 120. Herein, the expanded cryptography algorithm 122 may include an encryption module for expanding a length of a password PW or encryption modules for reconfiguring arrangement of a password with an expanded length.

The storage device 130 may be provided as a nonvolatile storage medium of the user device 100. The storage device 130 stores authentication data 135 that are generated via the expanded cryptography algorithm 122. The storage device 130 stores application programs, the OS image, and various user data. The storage device 130 may be implemented with a memory card (e.g., MMC, eMMC, SD, or Micro SD). The storage device 130 may include a NAND flash memory device with a mass storage capacity. In some embodiments, the storage device 130 may be implemented with a next-generation nonvolatile memory (e.g., PRAM, MRAM, ReRAM, or FRAM) or a NOR flash memory or a magnetic disk.

The input/output interface 140 receives a variety of data from a user 10 (refer to FIG. 1). In particular, the input/output interface 140 converts ID and password PW, which a user inputs using a keyboard, a keypad, or a touch-type display, into data that has a format the user device 100 utilizes. In addition, the input/output interface 140 may perform an operation of displaying a user's input or a user's authentication request to the user 10.

The system bus 150 may be a system bus that provides a network among internal hardware components of the user device 100. The system bus 150 may include, but is not limited to, a data bus, an address bus, and a control bus. The data bus may be a path through which data is transferred. The data bus may mainly provide a memory access path on the RAM 120 or the storage device 130. The address bus may provide a path through which addresses are exchanged among hardware components. The control bus may provide a path through which control signals are transferred among hardware components. A configuration of the system bus 150 is not limited to this disclosure. For example, the system bus 150 may further comprise an arbitration means for efficient management.

In FIG. 2, the CPU 110 and the RAM 120 are illustrated as being an expanded cryptography unit for executing the expanded cryptography algorithm 122 of the inventive concept. The reason is that the expanded cryptography algorithm is implemented with various hardware components although it is not solely executed by a combination of the CPU 110 and the RAM 120. A process such as iterative shifting frequently executed during encryption is easily implemented with hardware, and various hardware intellectual properties are widely used for such an encryption operation.

With the above description, the user device 100 processes a password that is used at user registration and user authentication using the expanded cryptography algorithm 122. During an encryption operation using the expanded cryptography algorithm 122, a length of a password PW input by a user may sharply increase and data arrangement may also change several times. As a password PW is encrypted according to the expanded cryptography algorithm 122, memory resource sharply increases. An increase in the memory resource may act as an obstacle when a password is restored through the Exhaustive Search Attack.

The above-described password registration and authentication method may be applied to various systems. For example, the above-described password registration and authentication method may be applied to a login operation that is executed when a computer or a mobile device is booted. Also, the above-described password registration and authentication method may be applied to authentication that is executed to use a specific application program or an operating system of a computer or a mobile device. In addition, a password processing method of the inventive concept is applicable to file encryption that is made to restrict access to a specific file. Furthermore, it is possible to improve a security level using the user authentication method of the inventive concept when connected to a smart card, such as a USIM chip or an NFC chip.

Figure 3:
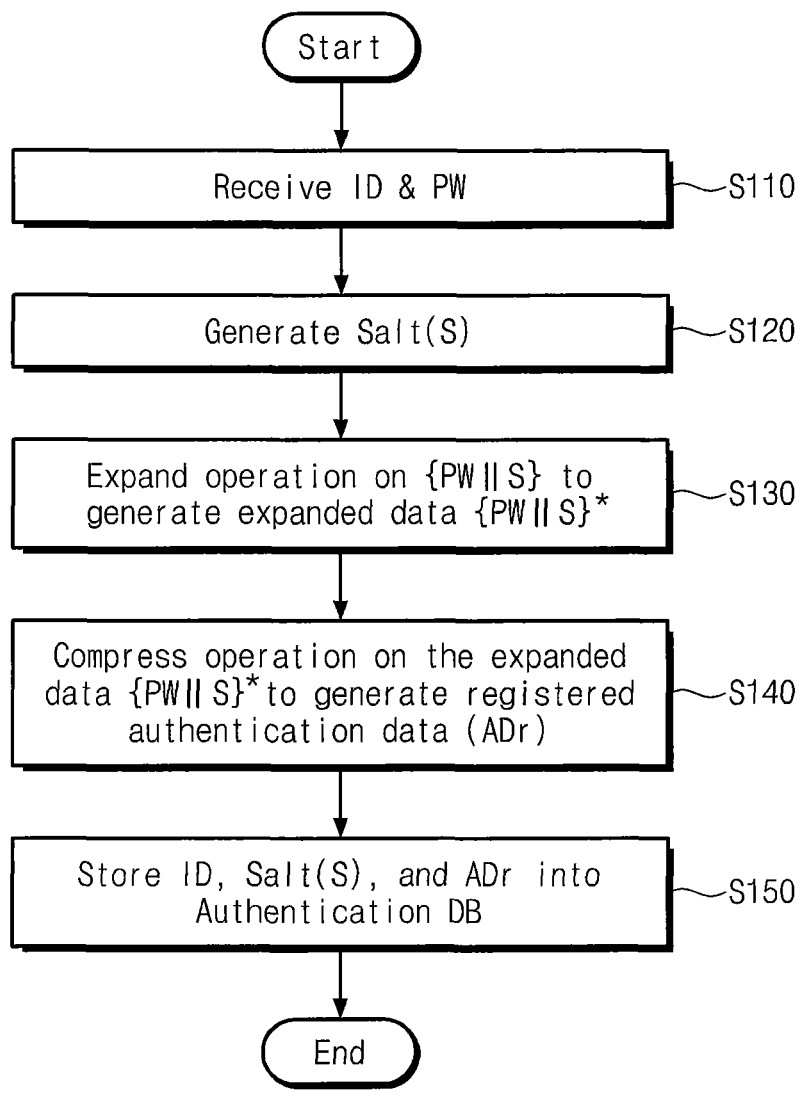
FIG. 3 is a flow chart schematically illustrating a user registration method according to an embodiment of the inventive concept.

FIG. 3 is a flow chart schematically illustrating a user registration method according to an embodiment of the inventive concept. Referring to FIGS. 2 and 3, a user device 100 processes a password PW using an expanded cryptography algorithm 122 and stores a processing result in the authentication database 130.

In block S110, the user device 100 receives ID and password PW for user registration. The user device 100 is provided through an input/output interface 140 with the ID and PW that a user inputs. A character string of the ID and PW provided via the input/output interface 140 is not restricted. For example, user's ID and PW may be determined by characters or numbers, which various input devices (e.g., a keyboard or a keypad) support, or a combination of special characters supported thereby.

In block S120, the user device 100 generates a salt S. The salt S may correspond to an additional code for increasing a length of the password PW. A value of the salt S may vary according to a user's ID. The salt S may be generated using a random number generator or a random number generation algorithm.

In block S130, the user device 100 applies the expanded cryptography algorithm 122 to a combination password ({PW∥S}) that is obtained by adding the salt S to the password PW. Herein, the expanded cryptography algorithm 122 may include, but is not limited to, a stream cipher, a key derivation function (KDF), and a pseudo random number generator (PRNG). A length of data may be expanded by several or several hundred times or several thousand times if the expanded cryptography algorithm 122 is applied to the combination password ({PW∥S}) that is a result of combining the password PW and the salt S so as to generate an expanded combination password ({PW∥S}*). Herein, an expansion rate may be determined variously according to a security level and controlled according to establishment of the expanded cryptography algorithm 122.

In block S140, the user device 100 compresses the expanded combination password ({PW∥S}*). The expanded combination password ({PW∥S}*) that has a very long length is stored in the authentication database 130 and imposes a burden on a load or comparison operation executed for authentication. This problem, however, may be solved by compressing the expanded combination password ({PW∥S}*) so as to have a relatively short length. The compression operation may be performed using a hash function, for example. The hash function may be an algorithm that converts any length of message into a fixed length of code. An encryption algorithm uses a key, but a hash algorithm does not use a key. Thus, the hash algorithm generates the same output with respect to the same input. However, it is comprehended that a variety of functions for providing an output with a fixed length are used as an algorithm for compression.

In block S150, authentication data ADr generated via a compression operation is stored in the authentication database 130. At this time, the user's ID and the salt S may be stored together with the authentication data ADr.

With the above-described method in which a password PW is processed and registered using the expanded cryptography algorithm 122 of the user device 100, a length of data may sharply increase when the password PW is encrypted. This may make it possible to exponentially increase a memory capacity required for a password restoring operation of an Exhaustive Search Attack that uses an encryption algorithm or authentication data ADr extorted. This may mean that the number of parallel processes used for the Exhaustive Search Attack based on parallel computing sharply decreases. Thus, it is possible to sharply increase a time taken to perform the Exhaustive Search Attack.

Figure 4:
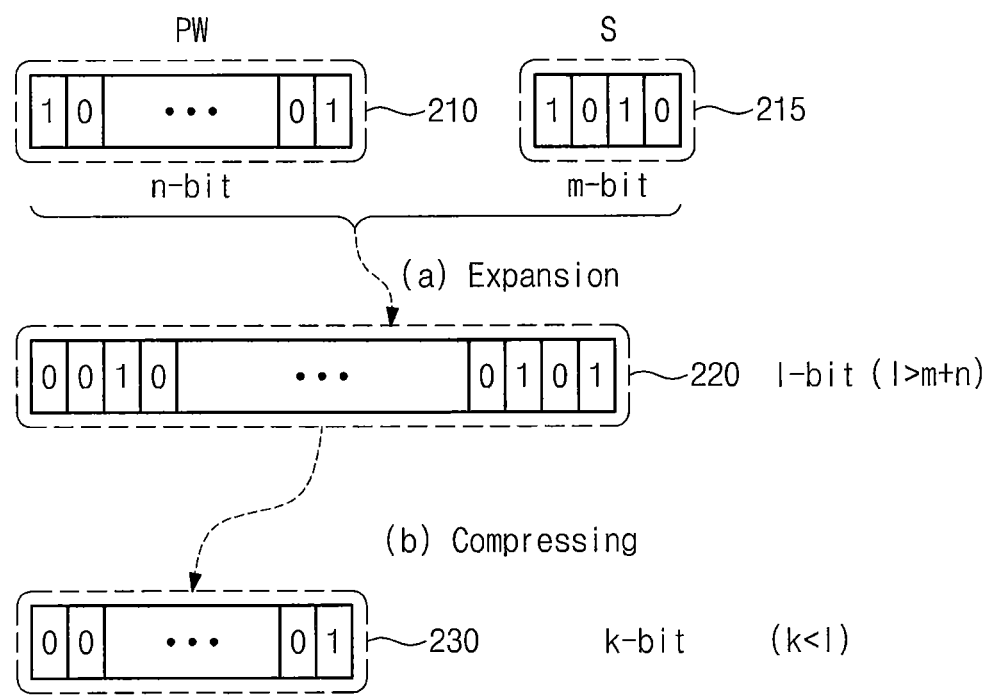
FIG. 4 is a diagram schematically illustrating a procedure in which data is processed at a user registration operation, according to an embodiment of the inventive concept.

FIG. 4 is a diagram schematically illustrating a procedure in which data is processed at a user registration operation, according to an embodiment of the inventive concept. Referring to FIG. 4, a password 210 that a user inputs may be expanded through combination with a salt 215 that a random number generation module 124 of a user device 100 generates, and the expanded password 220 is compressed and stored in a storage device 130. This will be more fully described below.

First, the user device 100 stores an n-bit password 210 (n being a natural number), which the user inputs, in a RAM 120. The password 210 may be a combination of characters, numbers, and special characters. The password 210 thus input may be converted into binary data. The random number generation module 124 generates an m-bit random number (m being a natural number). The random number generation module 124 produces the salt 215 using a variety of random number generation algorithms. The password 210 and the salt 215 are combined if they are prepared. The password 210 and the salt 215 are combined in a manner where they are arranged side by side. However, it is comprehended that the salt 215 is inserted in any location of the password 210.

As a result of combining the password 210 and the salt 215, a combination password ({PW∥S}) is processed by an expanded cryptography algorithm 122. The expanded cryptography algorithm 122 may utilize a stream cipher, a key derivation function, a pseudo random number generator, and so on. An expanded password ({PW∥S}*) is generated by processing the combination password ({PW∥S}) based on the expanded cryptography algorithm 122. At this time, the number (i) of bits of the expanded password ({PW∥S}*) may be several or several hundred times greater than the number (m+n) of bits of the combination password ({PW∥S}). Herein, parallel processes on candidates of the expanded password ({PW∥S}*) with i bits have to be executed to run the expanded cryptography algorithm 122 for the Exhaustive Search Attack. Memory resources for storing the candidates of the expanded password ({PW∥S}*) may be provided based on the number of parallel processes. The memory resources needed for parallel processes may increase in proportion to an increase in the number of bits of the expanded password ({PW∥S}*). Thus, the number of bits of the password 210 may act as a means for incapacitating the Exhaustive Search Attack.

K-bit authentication data 230 is generated by compressing the expanded password ({PW∥S}*) that is formed of I-bit data. The user registration operation is ended when the authentication data 230 is stored in a database.

Figure 5:
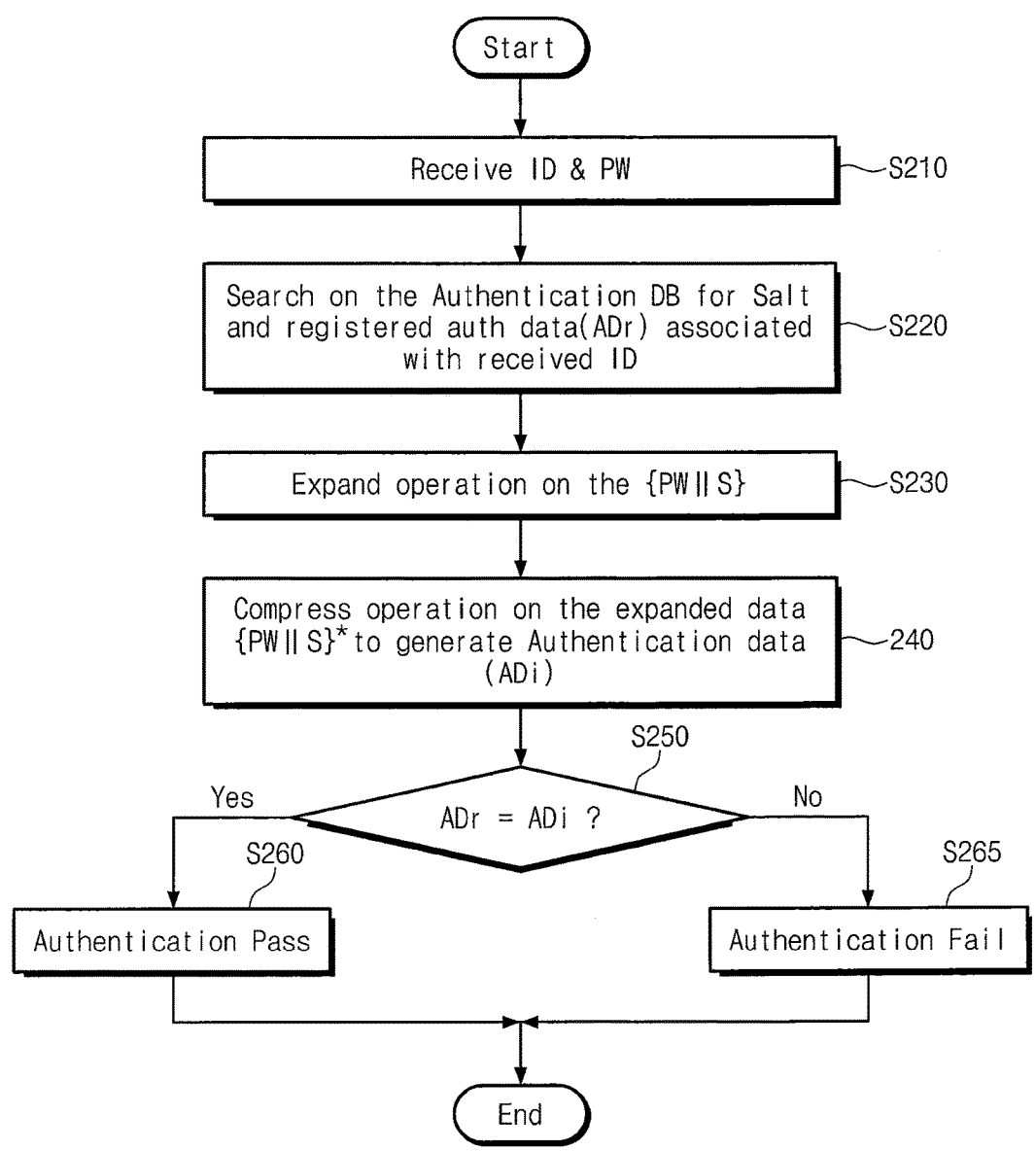
FIG. 5 is a flow chart schematically illustrating a user authentication method according to an embodiment of the inventive concept.

FIG. 5 is a flow chart schematically illustrating a user authentication method according to an embodiment of the inventive concept. Referring to FIGS. 2 and 5, a user device 100 compares registered authentication data ADr with authentication data ADi that is generated by the expanded cryptography algorithm 122 using a password PW that a user inputs.

In block S210, the user device 100 receives ID and PW for user authentication. The user device 100 receives via an input/output interface 140 the ID and PW that a user 10 inputs. The user 10 may input the ID and PW via various input devices, such as a keyboard, a keypad, and a touch-type display. The input/output interface 140 recognizes the password PW as a binary code and uses it as a source for user authentication.

In block S220, the user device 100 reads authentication data ADr corresponding to the input ID from the authentication database 130. Also, the user device 100 reads a salt S, corresponding to the ID the user 10 inputs, from the authentication database 130. The authentication data ADr and salt S thus read may be loaded on a RAM 120. An area of the RAM 120 in which data read from the authentication database 130 is stored may be defined as a security area where external access is prohibited.

In block S230, the user device 100 configures a combination password ({PW∥S}) by adding the salt S to the password PW. The user device 100 applies an expanded cryptography algorithm 122 to the combination password ({PW∥S}); thus, a length thereof is expanded by several or several hundred times or several thousand times. Herein, the expanded password may be denoted by ({PW∥S}*), and an expansion rate may be determined variously according to a security level or a resource of the user device 100.

In block S240, the user device 100 compresses the expanded password ({PW∥S}*). A compression operation may be carried out using a hash function (e.g., MD5, SHA-1, SHA-256, SHA-512, SHA-2, or SHA-3) for generating a code with a fixed length. However, the inventive concept is not limited thereto. The expanded password ({PW∥S}*) may be processed via a compression operation as authentication data ADi that is generated from a password which a user inputs.

In block S250, the authentication data ADi is compared with authentication data ADr that is previously registered and is read from authentication database 130. The method proceeds to block S260 if the authentication data ADi is equal to the authentication data ADr. In contrast, the method proceeds to block S265 if the authentication data ADi is different from the authentication data ADr.

In block S260, the user device 100 determines the user authentication to be passed, so it allows the use of the service by the user 10. In block S265, the user device 100 determines the user authentication to fail, so it does not allow the use of the service by the user 10. Also, the user device 100 outputs authentication-fail information to the user 10 via the input/output interface 140 and requests reentering of ID and PW.

There is described a user authentication method using the expanded cryptography algorithm 122, according to an embodiment of the inventive concept. The expanded cryptography algorithm 122 may process a password, which a user inputs, in the same manner as password registration. Although the expanded cryptography algorithm 122 and authentication data ADr are exposed, a relatively large amount of memory resources may be required to restore user's password.

Figure 6:
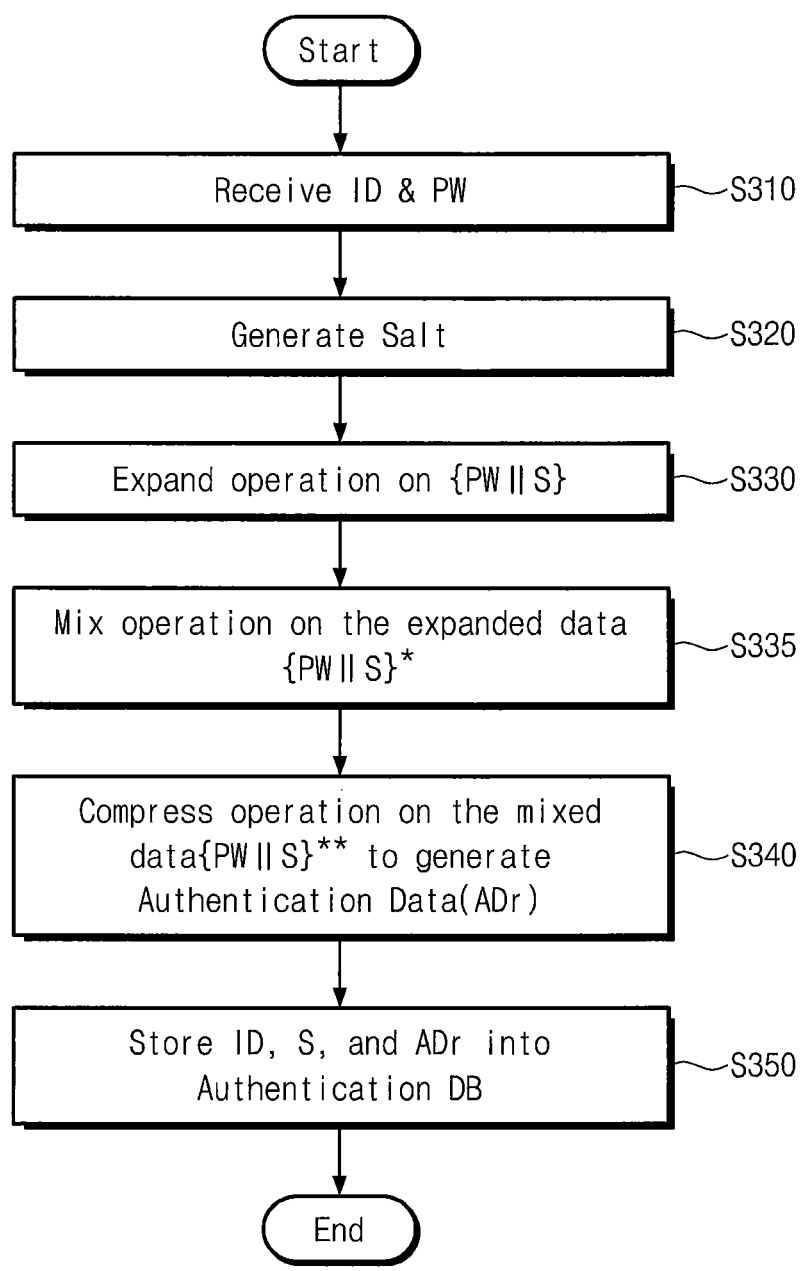
FIG. 6 is a flow chart schematically illustrating a user registration method according to another embodiment of the inventive concept.

FIG. 6 is a flow chart schematically illustrating a user registration method according to another embodiment of the inventive concept. Referring to FIGS. 2 and 6, a user device 100 processes a password PW using an expanded cryptography algorithm 122 and stores a processing result in the authentication database 130. The expanded cryptography algorithm 122 associated with the password PW may include an operation of expanding a length of the password PW and an operation of mixing expanded data.

In block S310, the user device 100 receives ID and password PW for user registration. The user device 100 is provided through an input/output interface 140 with the ID and PW that a user inputs.

In block S320, the user device 100 generates a salt S. The salt S may be generated using a random number generator or a random number generation algorithm. The number of bits of the salt S may be determined variously according to a security level of a user.

In block S330, the user device 100 applies the expanded cryptography algorithm 122 to a combination password ({PW∥S}) that is obtained by adding the salt S to the password PW. Herein, the expanded cryptography algorithm 122 may include, but is not limited to, a stream cipher, a key derivation function (KDF), and a pseudo random number generator (PRNG). A length of data may be expanded by several or several hundred times or several thousand times if the expanded cryptography algorithm 122 is applied to the combination password ({PW∥S}) that is a result of combining the password PW and the salt S.

In block S335, the user device 100 performs a mixing operation on the expanded password ({PW∥S}*). That is, the user device 100 performs an operation of rearranging bits of the expanded password ({PW∥S}*) without changing a length of the expanded password ({PW∥S}*). That is, a code length corresponding to the number of bits comprising the expanded password remains the same after completion of the mixing operation. For example, the user device 100 may use a block encryption manner of round function for the mixing operation. That is, the user device 100 provides randomness to bit arrangement of the expanded password ({PW∥S}*) using the round function, with a feistel structure or SPN (Substitution-Permutation Network) structure of function repeated at each round.

The bit arrangement of the expanded password ({PW∥S}*) may be updated as many as the number of rounds applied to the mixing operation. This mixing operation necessitates both securing of a memory resource for an update operation in each round and an operation time corresponding to the number of rounds, for the Exhaustive Search Attack. Thus, there is provided a security obstacle for markedly increasing a time taken to perform a decryption process of parallel processes according to establishment of the number of rounds. However, an algorithm used for the mixing operation is not limited to this example. For example, a variety of block encryption algorithms implemented with hardware or software may be used for the mixing operation.

In block S340, the user device 100 compresses a mixing password ({PW∥S}) generated via the mixing operation. Because it has a generally long length, the mixing password ({PW∥S}) is stored in the authentication database 130 and may impose a burden on a load or comparison operation executed for authentication. However, this problem may be reduced by compressing the mixing password ({PW∥S}**) so as to have a relatively short length. The compression operation may be performed using a hash function, for example.

In block S350, authentication data ADr generated via a compression operation is stored in the authentication database 130. At this time, the user's ID and the salt S may be stored together with the authentication data ADr.

With the above-described method in which a password PW is registered using the expanded cryptography algorithm 122 of the user device 100, the password PW is processed using expansion and mixing operations. Thus, the amount of memory resources required for each parallel process of an Exhaustive Search Attack may increase. In addition, the mixing operation may make it possible to increase a time taken to perform each parallel process in each memory resource of the Exhaustive Search Attack.

Figure 7:
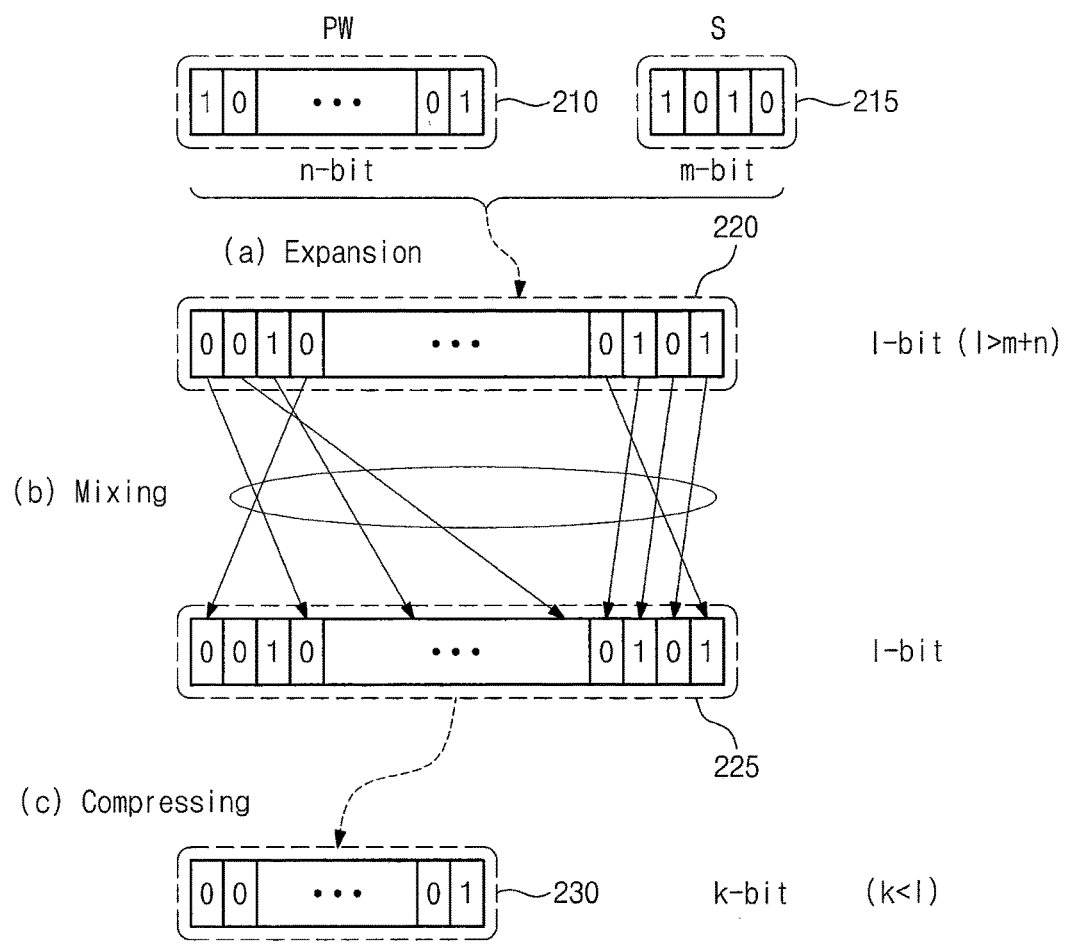
FIG. 7 is a diagram schematically illustrating a procedure in which data is processed at a user registration operation, according to another embodiment of the inventive concept.

FIG. 7 is a diagram schematically illustrating a procedure in which data is processed at a user registration operation, according to another embodiment of the inventive concept. Referring to FIG. 7, a password 210 that a user inputs may be expanded and mixed through combination with a salt 215 that a random number generation module 124 of a user device 100 generates, and the expanded and mixed password 220 is compressed and stored in a storage device 130. This will be more fully described below.

First, the user device 100 stores an n-bit password 210 (n being a natural number), which the user inputs, in a RAM 120. The password 210 may be a combination of characters, numbers, and special characters. The password 210 thus input may be converted into binary data. The random number generation module 124 generates an m-bit random number (m being a natural number). The random number generation module 124 produces the salt 215 using a variety of random number generation algorithms. The password 210 and the salt 215 are combined when they are prepared. The password 210 and the salt 215 are combined by a data process unit.

As a result of combining the password 21Q and the salt 215, a combination password ({PW∥S}) is processed by an expansion operation marked by a symbol (a). An expanded cryptography algorithm 122 for the expansion operation may utilize a stream cipher, a key derivation function, a pseudo random number generator, and so on. An expanded password ({PW∥S}*) is generated by processing the combination password ({PW∥S}) based on the expansion operation. At this time, the number (i) of bits of the expanded password ({PW∥S}*) may be several or several hundred times greater than the number (m+n) of bits of the combination password ({PW∥S}).

The expanded password ({PW∥S}*) 220 is processed using a mixing operation denoted by (a). The expanded password ({PW∥S}*) 220 generated via the mixing operation may be processed by a round function where arrangement is iteratively updated without changing a length of data. Thus, a mixed password ({PW∥S}) 225** has the size of I-bit data, but arrangement of data is changed because a plurality of round functions are used.

K-bit authentication data 230 is generated by compressing the mixing password ({PW∥S}) that is formed of I-bit data. The user registration operation is ended when the authentication data 230** is stored in a database.

Figure 8:
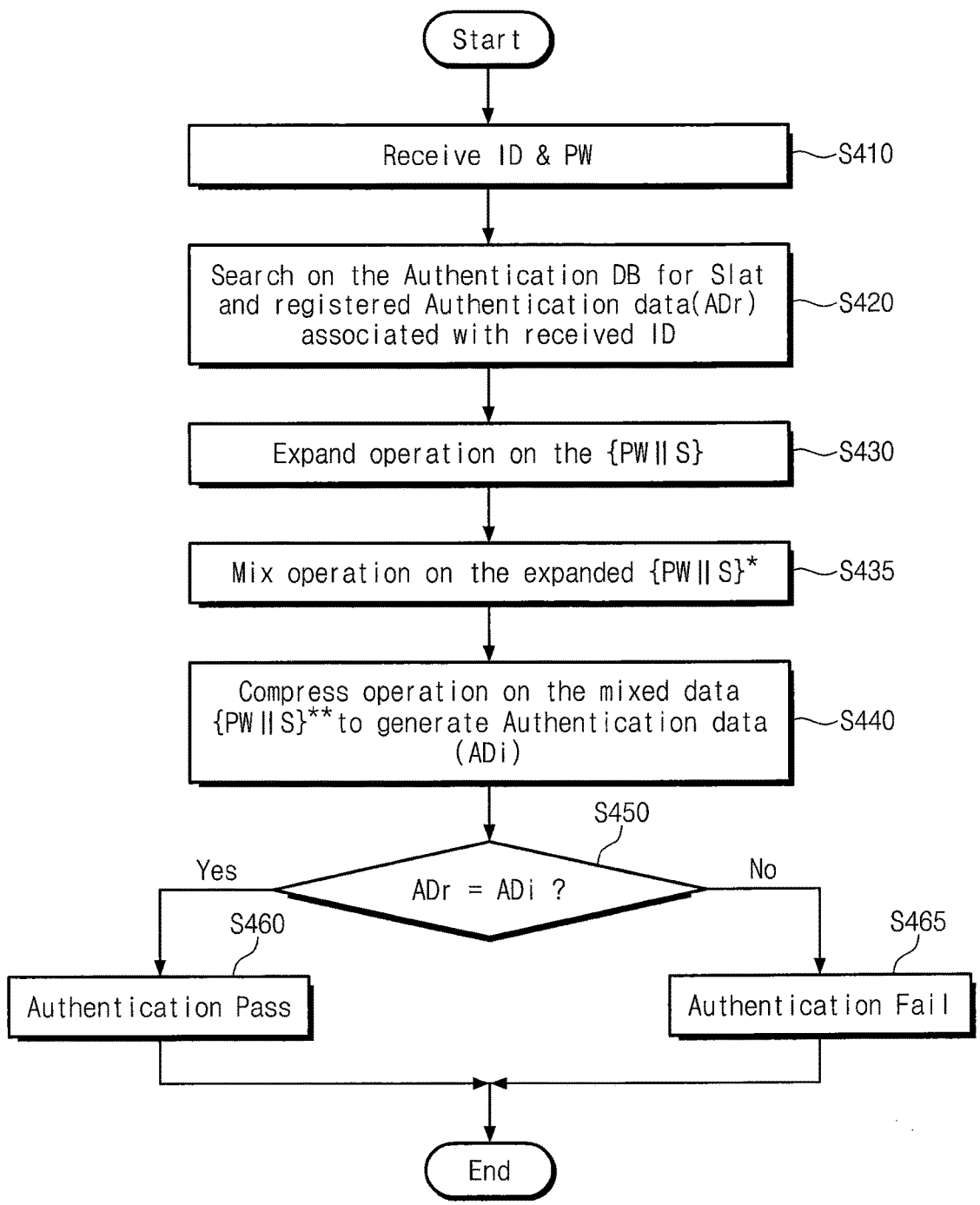
FIG. 8 is a flow chart schematically illustrating a user authentication method according to another embodiment of the inventive concept.

FIG. 8 is a flow chart schematically illustrating a user authentication method according to another embodiment of the inventive concept. Referring to FIGS. 2 and 8, a user device 100 compares registered authentication data ADr with authentication data ADi that the expanded cryptography algorithm 122 generates using a password PW that a user inputs.

In block S410, the user device 100 receives ID and PW for user authentication. The user device 100 receives via an input/output interface 140 the ID and PW that a user 10 inputs. The user 10 may input the ID and PW via various input devices, such as a keyboard, a keypad, and a touch-type display. The input/output interface 140 recognizes the password PW as a binary code and uses it as a source for user authentication.

In block S420, the user device 100 reads authentication data ADr corresponding to the input ID from the authentication database 130. Also, the user device 100 reads a salt S, corresponding to the ID the user 10 inputs, from the authentication database 130. The authentication data ADr and salt S thus read may be loaded on a RAM 120. An area of the RAM 120 in which data read from the authentication database 130 is stored may be defined as a security area where external access is prohibited.

In block S430, the user device 100 configures a combination password ({PW∥S}) by adding the salt S to the password PW. The user device 100 applies an expanded cryptography algorithm 122 to the combination password ({PW∥S}); thus, a length thereof is expanded by several or several hundred times or several thousand times. The combination password ({PW∥S}) may be output as expanded password (PW∥S}*).

In block S435, the user device 100 compresses the expanded password (PW∥S}*). That is, the user device 100 rearranges bits without changing a length of the expanded password (PW∥S}*).

For example, the user device 100 may use a block encryption manner of round function for the mixing operation. That is, the user device 100 provides randomness to the bit arrangement of the expanded password ({PW∥S}*) using the round function, with a feistel structure or SPN (Substitution-Permutation Network) structure of function repeated at each round. The expanded password ({PW∥S}*) is output as a mixing password ({PW∥S}**) through a mixing operation.

In block S440, the user device 100 compresses the mixing password ({PW∥S}). A compression operation may be carried out using a hash function (e.g., MD5, SHA-1, SHA-256, SHA-512, SHA-2, or SHA-3) for generating a code with a fixed length. However, the inventive concept is not limited thereto. The mixing password ({PW∥S}) expanded via the mixing operation may be processed as authentication data ADi that is generated from a password which a user inputs.

In block S250, the authentication data ADi is compared with authentication data ADr that is previously registered and is read from the authentication database 130. The method proceeds to block S460 if the authentication data ADi is equal to the authentication data ADr. In contrast, the method proceeds to block S465 if the authentication data ADi is different from the authentication data ADr.

In block S460, the user device 100 determines the user authentication to be passed, so it allows the use of the service by the user 10. In block S465, the user device 100 determines the user authentication to fail, so it does not allow the use of the service by the user 10. Also, the user device 100 outputs authentication-fail information to the user 10 via the input/output interface 140 and requests reentering of ID and PW.

There is described a user authentication method using the expanded cryptography algorithm 122, according to another embodiment of the inventive concept. The expanded cryptography algorithm 122 may process a password, which a user inputs, in the same manner as password registration. In addition, a mixing operation following an expansion operation may make it possible to increase a time taken to perform the Exhaustive Search Attack. Although the expanded cryptography algorithm 122 including the mixing operation and authentication data ADr are exposed, a relatively large amount of memory resources and a long processing time due to iteration of a round function may be required to restore user's password.

Figure 9A:
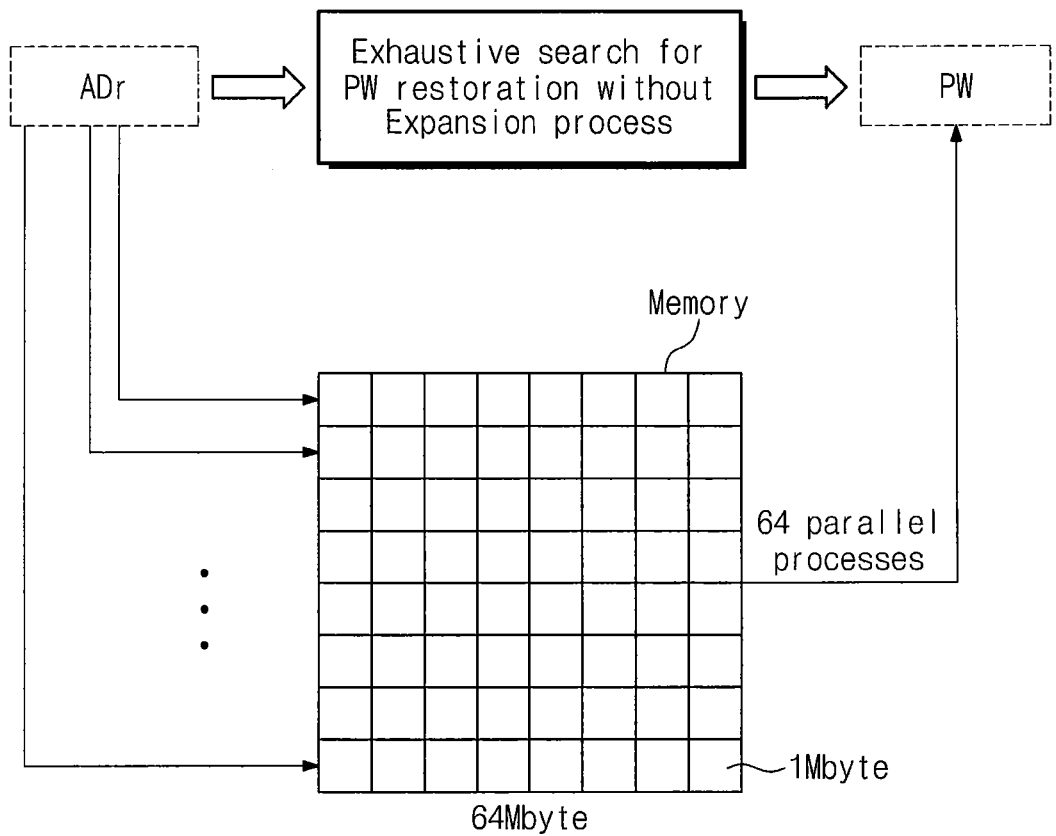
FIGS. 9A and 9B are block diagrams for describing an effect of embodiments of the inventive concept.
Figure 9B:
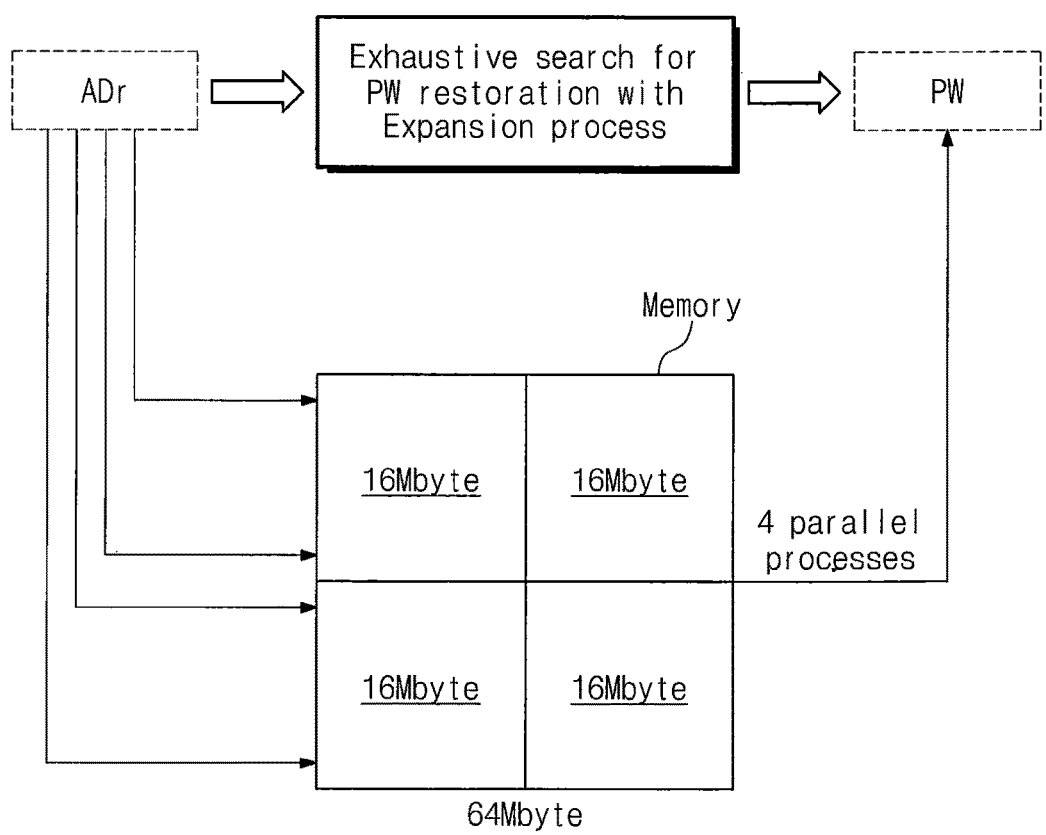

FIGS. 9A and 9B are block diagrams for describing an effect of the inventive concept. FIG. 9A shows an example in which a memory is used in the Exhaustive Search Attack in the event that an expansion operation is not used. FIG. 9B shows an example in which a memory is used in the Exhaustive Search Attack in the event that an expansion operation is used. It is assumed that the size of a memory resource to be used for the Exhaustive Search Attack is 64 MB (B indicating a byte).

Referring to FIG. 9A, it is assumed that a device (e.g., GPU or FPGA) has a memory resource of 64 MB to execute an encryption algorithm based on registered authentication data ADr exposed. Encryption algorithms on various input values may be executed in parallel. Also, it is assumed that a memory size of 1 MB is assigned for each of the parallel processes corresponding to the encryption algorithms. Because the size of memory used to restore any password PW corresponding to authentication data ADr is typically about 1 MB, it is possible to carry out 64 parallel processes in the 64 MB memory resource. In the event that an expansion operation is not used, 64 parallel processes are performed at the same time under a 64 MB hacking environment. It is assumed that a time taken for each parallel process to output the authentication data ADr is T0.

Under the above-described environment are performed 64 parallel processes on any passwords for obtaining an output value corresponding to registered authentication data ADr input during T0.

Referring to FIG. 9B, it is assumed that a process for executing an expanded cryptography algorithm according to an embodiment of the inventive concept necessitates at least a 16 MB memory resource from registered authentication data ADr be exposed. The expanded cryptography algorithm may include an expansion operation, a mixing operation, and a compression operation. It is assumed that the size of password is expanded about 16 times via the expansion operation. In this case, four parallel processes are carried out to execute the Exhaustive Search Attack using the 64 MB memory resource. Thus, it is possible to reduce the number of parallel processes, which are to be carried out at the same time to apply an encryption process including the expansion operation, by $\frac{1}{16}$.

In addition, the size of memory resource for a parallel process may increase considering the mixing operation described with reference to FIG. 2. Because an iterative shifting operation is performed due to a round function, a time taken to execute a parallel process may be longer than T0 described with reference to FIG. 9A. The size of memory resource increased per parallel process and a use time may act as a great obstacle to the Exhaustive Search Attack.

Figure 10:
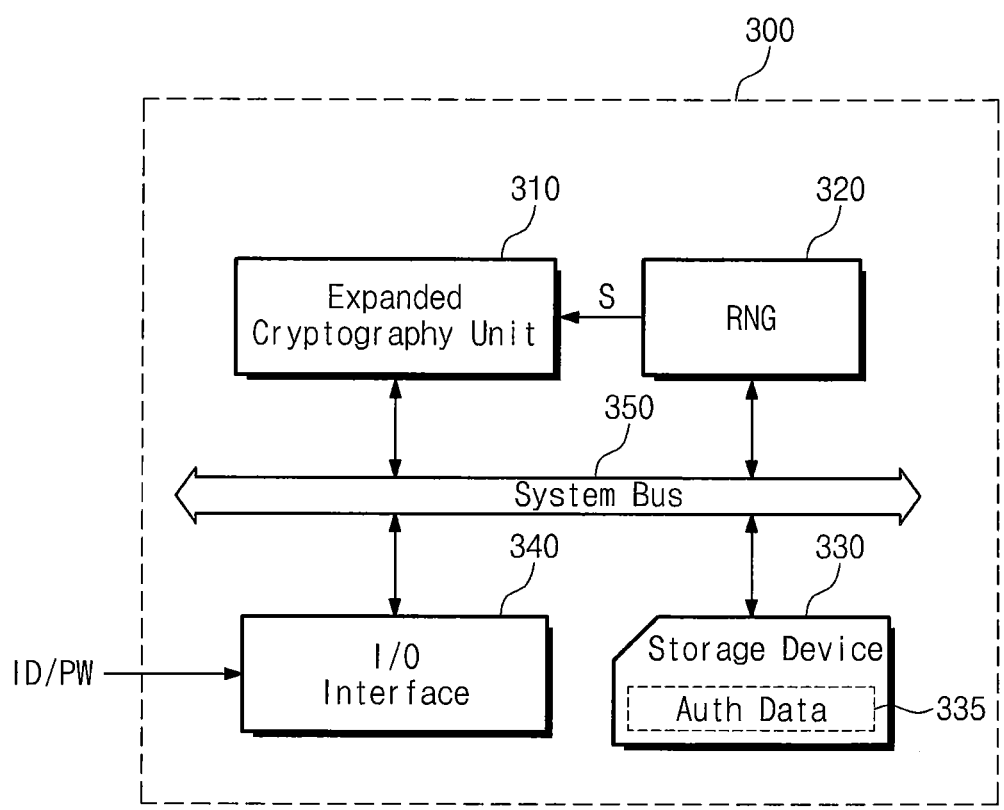
FIG. 10 is a block diagram schematically illustrating a user device according to another embodiment of the inventive concept.

FIG. 10 is a block diagram schematically illustrating a user device 300 according to another embodiment of the inventive concept. Referring to FIG. 10, a user device 300 performs authentication based on a password and incorporates an expanded cryptography unit 310, a random number generator 320, a storage device 330, and an input/output interface 340, which are connected electrically to a system bus 350.

The expanded cryptography unit 310 may be formed of a hardware unit that performs password registration and authentication of the user device 300. The expanded cryptography unit 310 combines a salt S from the random number generator 320 and a user's password PW from the input/output interface 340 and then outputs a combination password ({PW∥S}). The expanded cryptography unit 310 expands the combination password ({PW∥S}). As described above, a stream cipher, a key derivation function, a pseudo random number generator, and so on may be applied to the expansion operation. Such functions may be executed by the expanded cryptography unit 310 in hardware or software.

In addition, the expanded cryptography unit 310 performs a mixing operation on an expanded password ({PW∥S}*) that is generated via the expansion operation. To perform the mixing operation, the expanded cryptography unit 310 carries out an operation of rearranging bits without changing a length of the expanded password ({PW∥S}*). For the mixing operation, the expanded cryptography unit 310 may use a round function having a feistel structure or SPN (Substitution-Permutation Network) structure that may be implemented in hardware.

The expanded cryptography unit 310 may also perform a compression operation, such as a hash function. the expanded cryptography unit 310 compresses the expanded password ({PW∥S}*) or mixing password ({PW∥S}**) to generate authentication data ADr for user registration and authentication data ADi for user authentication.

The random number generator 320 generates the salt S. A random number may be provided as a means for increasing entropy at an encryption operation. The random number generator 320 may be implemented with hardware.

The storage device 330 may be provided as a nonvolatile storage medium of the user device 300. The storage device 330 stores authentication data ADr that is generated at password registration. The storage device 330 may be implemented with a memory card (e.g., MMC, eMMC, SD, or Micro SD). The storage device 330 may include a NAND flash memory device with a mass storage capacity. In other embodiments, the storage device 330 may be implemented with a next-generation nonvolatile memory (e.g., PRAM, MRAM, ReRAM, or FRAM) or a NOR flash memory.

The input/output interface 340 receives a variety of data from a user 10. In particular, the input/output interface 340 converts ID and password PW, which a user inputs using a keyboard, a keypad, or a touch-type display, into data that has a format the user device 300 utilizes. In addition, the input/output interface 340 may perform an operation of displaying a user's input or authentication request to the user 10. The system bus 350 may be a system bus that provides a network in the user device 300.

With the above description, the user device 300 processes a password that is used at user registration and user authentication using the expanded cryptography unit 310. During an encryption operation using the expanded cryptography unit 310, a length of a password PW input by a user sharply increases and data arrangement is also changed. The expanded cryptography unit 310 may make it possible to increase memory resources sharply. An increase in the memory resource may act as an obstacle when a password is restored through the Exhaustive Search Attack.

Herein, the user device 300 may include information devices, such as personal computers, servers, cellular phones, PDAs, digital cameras, camcorders, voice recorders, MP3 players, handheld computers, game consoles, and so on. The user device 300 may include security devices such as password-based digital door lock systems, access systems, and so on.

Figure 11:
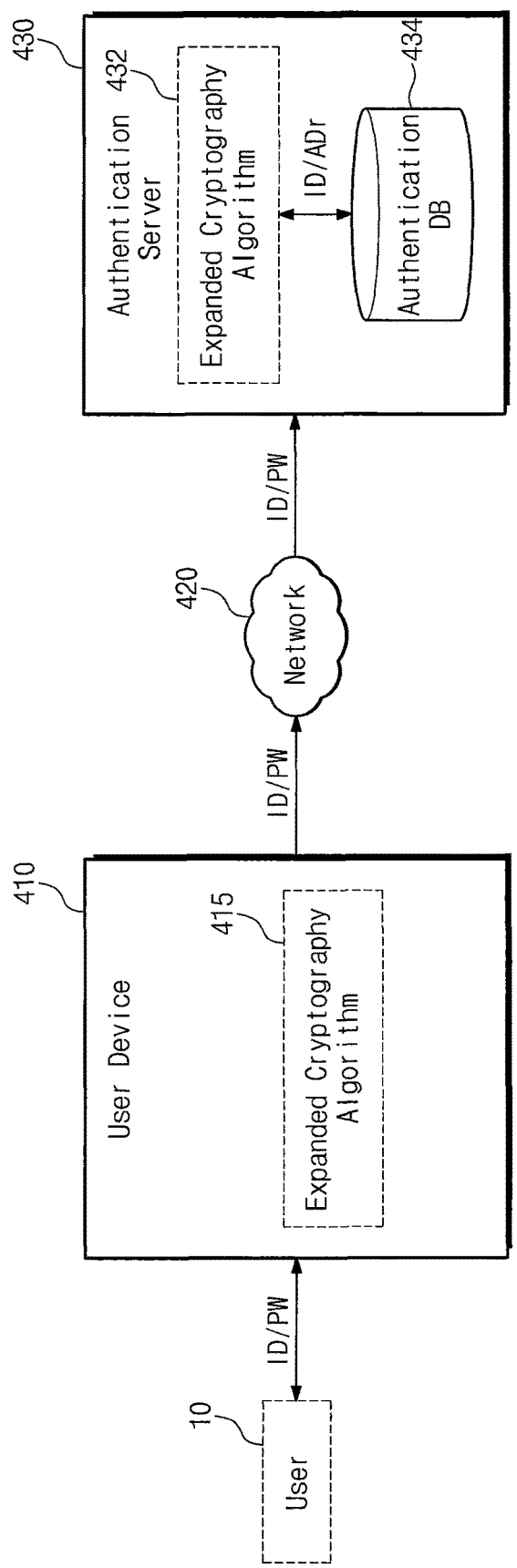
FIG. 11 is a block diagram schematically illustrating an authentication system according to another embodiment of the inventive concept.

FIG. 11 is a block diagram schematically illustrating an authentication system according to another embodiment of the inventive concept. Referring to FIG. 11, an expanded cryptography algorithm may be used to authenticate a password in a network, such as an electronic payment system.

The user 10 inputs ID and PW in the user device 410. The user device 410 performs user registration and authentication in the same manner as described with reference to FIG. 1. That is, the user device 410 processes a user's password using an expanded cryptography algorithm 415. The user device 410 carries out an expansion operation, a mixing operation, and a compression operation on the password PW. Authentication data ADr generated via such operations may be stored in a nonvolatile storage medium (not shown) of the user device 410. The user device 410 processes a password, which is input to use the user device 410, using the same expanded cryptography algorithm 415, to generate authentication data ADi. The user device 410 compares the authentication data ADi with registered authentication data ADr.

In addition, it is possible to perform network authentication via the user device 410. For a user to utilize a specific service via a network 420, user registration and user authentication may be performed in an authentication server 430. If the user 10 transfers a user's ID and PW to the authentication server 430 via the network 420, then expansion, mixing, and compression operations on the password PW are carried out according to an expanded cryptography algorithm 432 of the authentication server 430. Authentication data ADr generated via the above-described encryption operations may be registered at an authentication database 434. The same expanded cryptography operation is performed at the user authentication, and the registered authentication data ADr is compared with authentication data ADr that is generated via the expanded cryptography operation. The service use of the user 10 may be allowed or prohibited according to the comparison result.

With the password-based user registration and authentication using the network 420, an authentication system countervailing the Exhaustive Search Attack using parallel processes is provided even though the authentication data ADr and the expanded cryptography algorithm are exposed. The network-based password authentication system may be utilized for network computers, pay Wi-Fi connection of mobile devices, specific network connection of a user, and so on.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A password registration method of a user device which uses a password-based authentication manner, comprising:
performing operations as follows on at least one processor:
combining a salt with an input password to generate a combination password having a bit length corresponding to a sum of a bit length of the salt and a bit length of the input password;
expanding the combination password to generate an expanded password, a bit length of the expanded password being greater than a bit length of the combination password;
compressing the expanded password to output authentication data; and
storing the authentication data in an authentication database;
wherein combining the salt with the input password comprises inserting the salt onto the input password at any bit location thereof.

2. The password registration method of claim 1, wherein the combination password is expanded using at least one of a stream cipher, a key derivation function, and a pseudo random number generator.

3. The password registration method of claim 1, further comprising:
performing a mixing operation in which an arrangement of bits of the expanded password is reconfigured, with a code length of the expanded password maintained.

4. The password registration method of claim 3, wherein the mixing operation comprises:
iteratively applying a round function to the expanded password during a plurality of rounds.

5. The password registration method of claim 4, wherein the round function comprises a function with a feistel structure or substitution-permutation network structure.

6. The password registration method of claim 1, further comprising:
generating the salt using a random number generator in response to the input password.

7. A password authentication method of a user device which uses a password-based authentication manner, comprising:
reading first authentication data and a salt corresponding to an ID) of a user from an authentication database;
combining the salt with an input password to generate a combination password having a bit length corresponding to a sum of a bit length of the salt and a bit length of the input password;
expanding the combination password to generate an expanded password, a bit length of the expanded password being greater than a bit length of the combination password;

compressing the expanded password to output second authentication data; and comparing the first authentication data and the second authentication data to authenticate the password of the user;

wherein combining the salt with the input password comprises inserting the salt onto the input password at any bit location thereof.

8. The password authentication method of claim 7, wherein the first authentication data is data that is generated by expanding or compressing a password that the user previously registers.

9. The password authentication method of claim 7, wherein the combination password is expanded using at least one of a stream cipher, a key derivation function, and a pseudo random number generator.

10. The password authentication method of claim 7, further comprising:

performing a mixing operation in which an arrangement of bits of the expanded password is reconfigured, with a code length of the expanded password maintained.

11. The password authentication method of claim 10, wherein the mixing operation comprises:

iteratively applying a round function to the expanded password to generate a mixing password.

12. The password authentication method of claim 11, further comprising:

generating the mixing password as the second authentication data via a compression operation.

13. The password authentication method of claim 11, wherein the round function comprises a function with a feistel structure or substitution-permutation network structure.

14. The password authentication method of claim 7, wherein compressing the expanded password comprises:

using a compression algorithm that comprises a hash function.

15. A user device which performs password-based user authentication, comprising:

an input/output interface configured to receive an ID and a password of a user; and an expanded cryptography unit configured to combine a salt with the password to generate a combination password, the combination password having a bit length corresponding to a sum of a bit length of the salt and the password, and to expand the combination password to output an expanded password and compress the expanded password to output authentication data;

wherein a bit length of the expanded password is greater than a bit length of the combination password; and wherein the expanded cryptography unit is further configured to combine the salt with the password by inserting the salt onto the password at any bit location thereof.

16. The user device of claim 15, further comprising:

a nonvolatile memory device configured to store the authentication data.

17. The user device of claim 15, wherein the expanded cryptography unit comprises:

a central processing unit configured to perform an expansion operation on the password or a compression operation on the expanded password; and a RAM configured to store computer readable program code to implement an expanded cryptography operation for the expansion operation or the compression operation.

18. The user device of claim 17, wherein the RAM is further configured to store a random number generation module that generates the salt to be combined with the password during the expansion operation.

19. The user device of claim 17, wherein the central processing unit is further configured to perform a mixing operation in which an arrangement of bits of the expanded password is changed without a change in a length of the expanded password.

* * * * *